United States Patent

Barr

[15] 3,675,833
[45] July 11, 1972

[54] CARRYING RACK FOR MOTORCYCLE OR SIMILAR VEHICLE

[72] Inventor: Robert D. Barr, 5945 Cloverly Avenue, Temple City, Calif. 91780

[22] Filed: Oct. 7, 1970

[21] Appl. No.: 78,970

[52] U.S. Cl. .................................224/29 R, 224/42.03 B
[51] Int. Cl. ....................................................B60r 9/10
[58] Field of Search .................224/42.03 B, 29 R; 214/450; 296/1 A; 280/179 R

[56] References Cited

UNITED STATES PATENTS

| 1,887,325 | 11/1932 | Pratt et al. | 296/1 A |
| 1,824,370 | 9/1931 | Reid | 296/1 A |
| 3,586,188 | 6/1971 | Cambell | 214/450 |
| 3,529,737 | 9/1970 | Daugherty | 214/450 |
| 3,418,008 | 12/1968 | Durbin | 280/179 R |

Primary Examiner—Gerald M. Forlenza
Assistant Examiner—Lawrence J. Oresky

[57] ABSTRACT

A tie-down for a motorcycle, trailbike, mini-bike or other two wheel motorized bycycle to secure a position which permits the motorcycle or other vehicle to be safely transported and protected from damage during the transporting from one point to another. This tie-down carrying rack may be mounted on the front or rear of any passenger vehicle, truck, camper, trailer, trailer bed, travel trailer, boat trailer or trailer especially constructed for motorcycles or other two wheel vehicular transporting.

1 Claim, 3 Drawing Figures

PATENTED JUL 11 1972

3,675,833

CARRYING RACK FOR MOTORCYCLE OR SIMILAR VEHICLE

A person who possesses a two wheel motor vehicle, motorcycle, or other similar vehicle, who desires to safely and securely transport that vehicle from one point to another has a need for a simple, quick and secure tie-down carrying rack for said transporting. This person may desire to transport said two wheel vehicle by a four wheel passenger vehicle, truck, trailer, camper, travel trailer or motorcycle trailer. Said person has need to be able to transport the two wheel vehicle safely from damage during transporting.

It is an object of the present invention to provide a novel motorcycle tie-down carrying rack to protect the two wheel vehicle from in-transit damage.

It is a further object of the present invention to provide a standard, universal device, adjustable to fit all existing two wheel motorcycles or other two wheel motorized vehicles from damage during transport.

The factors of the present invention, which are believed to be novel, are set forth with particularity in the appended claims.

The present invention, both as to its organization and manner of operation, together with further objects and advantages thereof, may best be understood by reference to the following description taken in connection with the accompanying drawings, in which.

Figure 1:
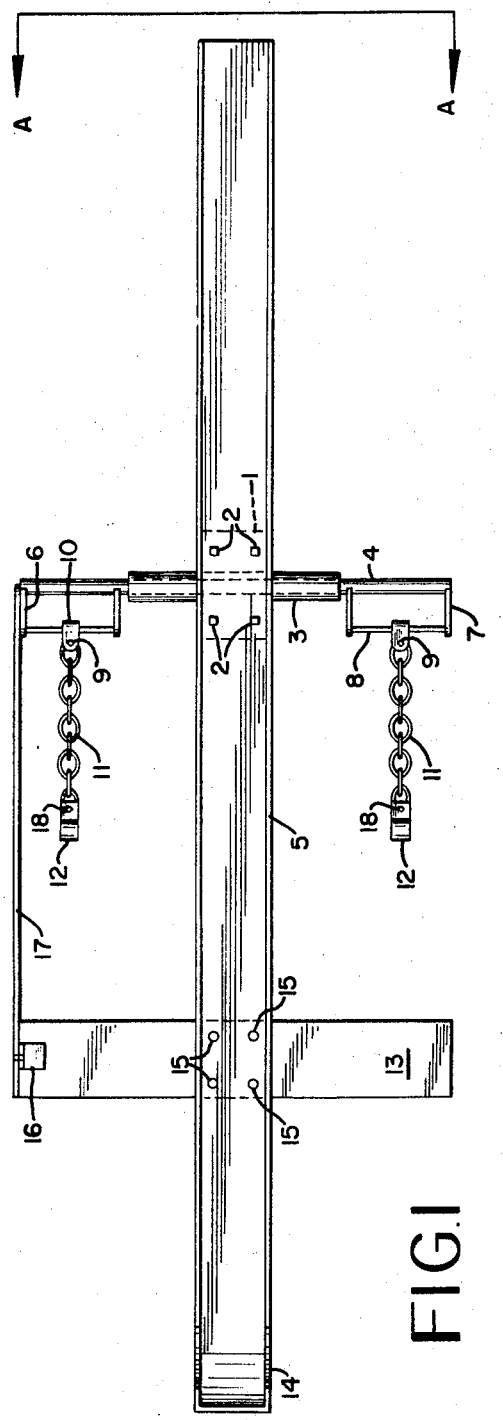
FIG. 1 is a top view showing the carrying rail and lock-down mechanism in its locked position.

Turning now to the drawings, in FIG. 1, Plate 1 is secured to the carrying rail 5 by bolts inserted through holes designated 2, and sleeve 3 is welded perpendicularly to the center of Plate 1. Tube 4 floats and fits inside sleeve designated 3 so as to revolve freely. The arms designated 6 and 7 are fixed to tube 4 so as to create a U-shaped device. Bar 8 is the connecting section between arms 6 and 7 to hold a chain or other tie-down device. Saddle clamp 10 is secured to bar 8 and adjustable chain link 11, or other similar type connecting device, by a bolt designated 9 and a ring designated 12 is connected to adjustable chain link designated 11 secured by another bolt designated 18 at the ring. Bar 13 is perpendicularly secured to carrying rail 5 through holes designated 15, said bar designated as 13 having some sort of a security device designated at position 16 on said bar 13. Butt-end 14 is a more or less vertical bar, angling slightly away from the center of the device.

Figure 2:
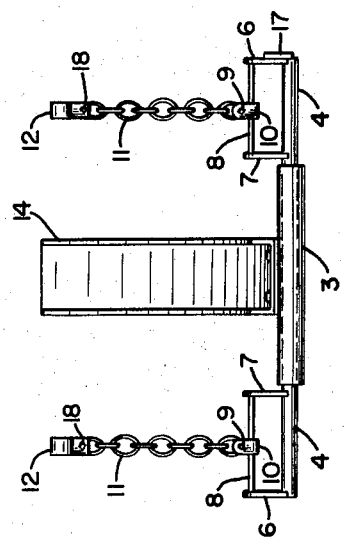
FIG. 2 is a frontal view of the carrying rack showing the butt-end and lock-down device with the lock-down chains in a position to place over the motorcycle or other two wheel vehicular foot pegs or foot resting device.

In FIG. 2, butt-end 14 is positioned such to receive the front tire of the wheeled vehicle and ring designated as 12, or other connecting device, is in position to slip over or tie down or secure the motorcycle or motorbike foot peg on each side of said vehicle so as to hold the motorcycle or motorbike in an upright position during tie-down preparation.

Figure 3:
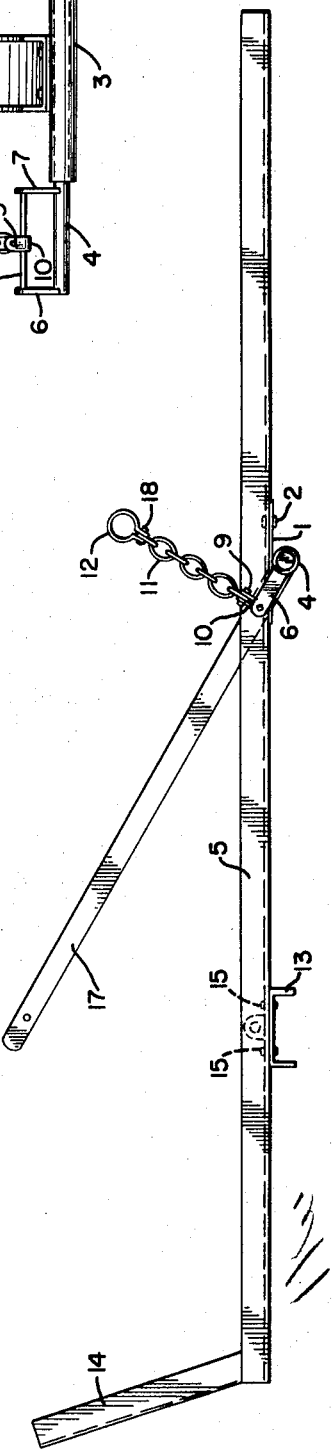
FIG. 3 is a sectional side view showing the elevation, the butt-end guide rail, the lock-down mechanism and the lock-down bar as shown in FIG. 1.

In FIG. 3, lever bar designated as 17 is situated over arm 6 and fulcrum 4, after placing the ring designated as 12, or other tying down device, over the motorcycle or motorbike foot pegs, to the lever bar pulled tight against fulcrum designated as 4 with said lever bar designated as 17 parallel to rail designated as 5. By creating the pressure against the motorcycle or motorbike foot pegs with the ring designated as 12, or other similar device, causing the front wheel to be butted against the butt-end designated as 14, the motorcycle or motorbike is safely secured for transporting.

I claim:

1. A carrying device for a motorcycle or other two wheel motor vehicle, comprising:
   a. a carrying bar to hold the front and back wheels of a two wheel motor vehicle;
   b. a butt-bar at one end of the holding rail to support the two wheel vehicle;
   c. a leverage type lock which will hold the two wheel motor vehicle secure and prevent damage during transit; and
   d. the leverage type lock pulling the two wheel motor vehicle tight and with pressure from the foot pegs so as to prevent said motor vehicle from being moved, removed or stolen from its carrying position during transit and further prevent damage during transit;
   e. a shaft mounted on and extending transversely of the carrying bar;
   f. a U-shaped mount having the free ends of its legs attached along the length of the shaft;
   g. a chain having one end connected to the bight of the U mount and its other end removably connected to the foot peg of the motorcycle;
   h. a lever arm having one end fixed to the end of the shaft;
   i. means to lock the other end of the lever arm parallel to the carrying bar to retain the chain under tension.

* * * * *